No. 748,143. PATENTED DEC. 29, 1903.
J. T. ARMSTRONG & A. ORLING.
WIRELESS TELEGRAPHY AND TRANSMISSION OF POWER.
APPLICATION FILED MAR. 11, 1901.
NO MODEL.
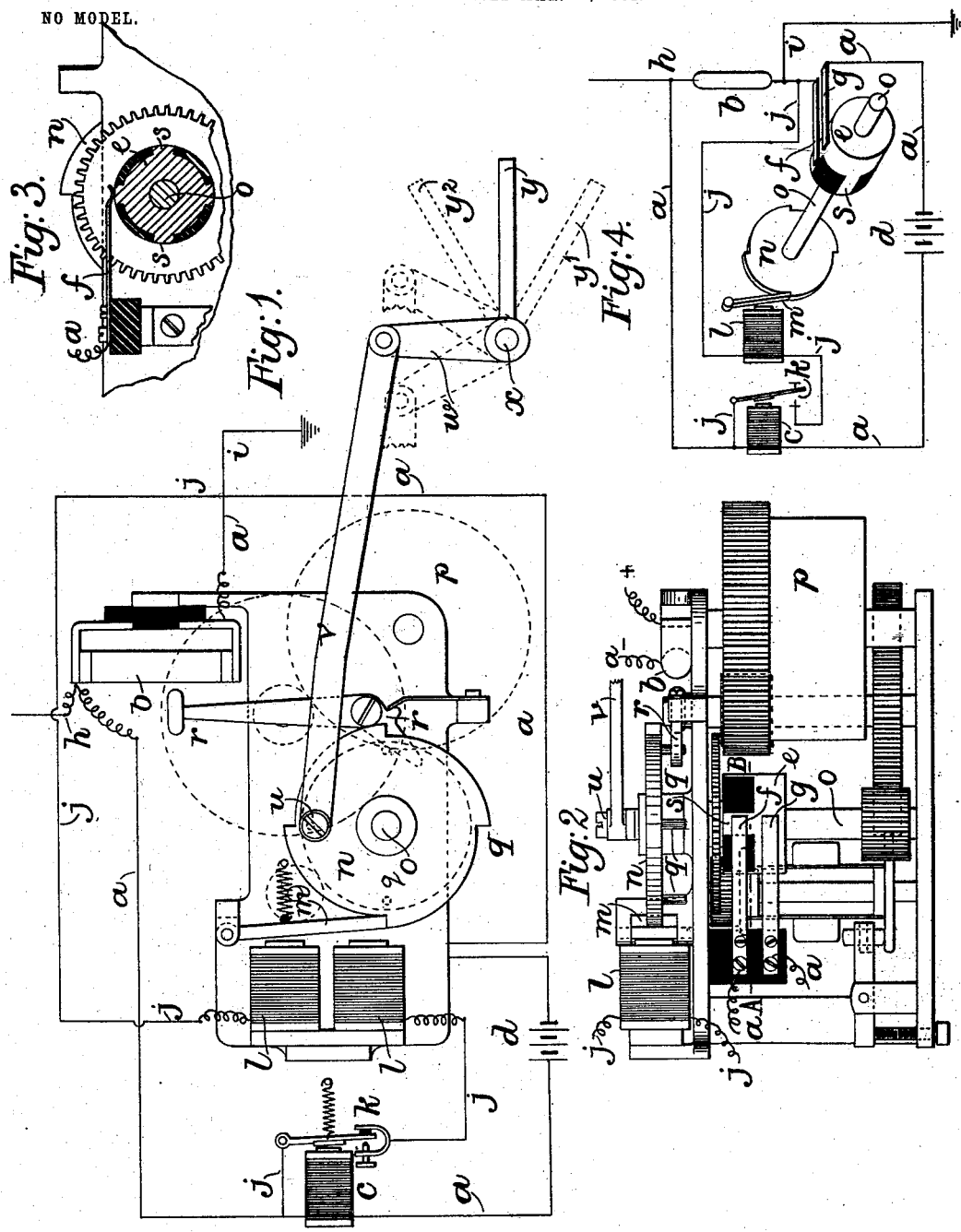
Witnesses:
Inventors No. 748,143. Patented December 29, 1903.

UNITED STATES PATENT OFFICE.

JAMES T. ARMSTRONG AND AXEL ORLING, OF LONDON, ENGLAND.

WIRELESS TELEGRAPHY AND TRANSMISSION OF POWER.

SPECIFICATION forming part of Letters Patent No. 748,143, dated December 29, 1903.

Application filed March 11, 1901. Serial No. 50,702. (No model.)

*To all whom it may concern:*

Be it known that we, JAMES TARBOTTON ARMSTRONG, a subject of the King of England, and AXEL ORLING, a subject of the King of Sweden and Norway, both residing at London, England, have invented new and useful Improvements in Wireless Telegraphy and Transmission of Power, of which the following is a specification.

Our invention relates to means of and apparatus for telegraphing and controlling mechanisms from a distance by means of electromagnetic waves, and has for its object the various improvements hereinafter set forth whereby these purposes are satisfactorily accomplished.

In carrying out our invention we employ a transmitter of any well-known suitable form, consisting, essentially, of an electromagnetic-wave propagator provided with means, such as a key, of emitting such waves at suitable periods and in any desired order and a receiving apparatus comprising a normally closed electric circuit containing a suitable detector or equivalent part, hereinafter referred to as a "coherer," an electromagnet or its equivalent, a local battery or other convenient source of energy to supply the current, and a circuit-breaking device, hereinafter described. The said electromagnet is adapted to operate a switch whereby a shunt of low resistance is "cut in" by which the coherer is short-circuited and a suitable telegraph instrument operated or a second electromagnet energized, or both. Upon the magnet last referred to attracting its armature a detent is withdrawn from engagement with a ratchet-wheel mounted upon the shaft of a spring-motor or other suitable source of power, which thereupon begins to rotate. Upon this shaft or another part driven by it is mounted an insulated break-wheel having a suitable number of breaks so timed and arranged with relation to the teeth of the ratchet-wheel that its brush or brushes bear upon conducting portions whenever the detent engages a tooth of the ratchet-wheel to stop the rotation of the said shaft. The function of this break-wheel is to open the circuit directly after the motor starts, but before the decohering operation takes place or is completed, so that the effect of local disturbances which occur when a circuit is broken may be afterward corrected, that the receiving-circuit may be open during the said decohering operation, which is thus rendered more effective, and that the detent may immediately return to its normal position in readiness to engage the next tooth of the ratchet-wheel, and so stop the motor.

We will now more particularly describe our invention, reference being made to the accompanying drawings, in which—

Figure 1 is a plan showing parts of our improved apparatus diagrammatically. Fig. 2 is a side elevation showing parts of the same. Fig. 3 is a transverse section through the break-wheel, taken on the line A B in Fig. 2; and Fig. 4 is a diagram showing the arrangement of the circuit.

According to the construction shown in Figs. 1 to 4, our improved receiving apparatus consists of a normally closed electric circuit $a$, containing a coherer $b$ and electromagnet $c$, a local battery $d$, a break-wheel $e$, and two brushes $f$ and $g$, the coherer being connected at $h$ with an aerial collector and conductor and at $i$ to the earth in the usual way. A shunt $j$ is provided having a switch $k$, which is operated by the magnet $c$ and is adapted to energize an electromagnet $l$. Upon the arrival of suitable electromagnetic waves the resistance of the coherer $b$ is reduced in the well-known manner and sufficient current permitted to flow through the circuit to energize the magnet $c$, whereupon the switch $k$ is closed and current permitted to flow through the shunt $j$, which energizes another electromagnet $l$, and short-circuits the coherer $b$. Owing to the resistance of the circuit being thus lowered, a stronger current now flows through the circuit, which imparts considerable energy to the magnet $c$ (which keeps the switch $k$ closed) and to the magnet $l$. The magnet $l$ is provided with a spring-controlled armature $m$, which also forms a detent and is adapted to normally engage one or other of the teeth of a ratchet-wheel $n$. This ratchet-wheel $n$ is mounted upon the shaft $o$ of a spring-motor $p$ of any suitable construction, which shaft $o$ also carries the break-wheel $e$, hereinbefore referred to. The ratchet-wheel $n$ is provided with a suitable number of laterally-extending pins $q$, by means of which a spring-controlled trip-hammer $r$ is operated every time the said ratchet-wheel is permitted to rotate by the attraction of the detent $m$ by the magnet $l$. In this way the hammer is caused to tap the coherer to restore it to its normal condition of resistance after the circuit $a$ has been opened by the rotation of the break-wheel $e$, but before the said circuit is again closed by the contact of the brush $f$ with the next conducting portion $s$ of the said break-wheel. By this arrangement the following sequence of operations is obtained: Upon the arrival of the electromagnetic waves the resistance of the coherer $b$ and the circuit $a$, of which it forms a part, is reduced and the switch $k$ operated, and as a result the electromagnet $l$ is energized and attracts its armature (the detent) $m$ from engagement with the ratchet-wheel $n$. The shaft $o$ is now released and begins to move under the influence of its motor $p$, carrying with it the break-wheel $e$, which immediately afterward opens the circuit $a$, permitting the detent $m$ to return to its normal position to engage the next tooth of the ratchet-wheel. The hammer $r$ is now tripped and decohesion effected while the circuit is still open, which is thereafter closed when the shaft $o$ stops by the contact of the brush $f$ with the next conducting portion $s$ of the break-wheel. In this position the apparatus is in a condition to receive the next impulse when the electromagnetic waves again arrive, the result of which will be to permit the shaft $o$ to rotate another step in the manner hereinbefore described, during which the cycle of operations is again performed.

In applying our invention to effect various operations from a distance, such as the steering of torpedoes or the like, we provide the ratchet-wheel $n$ with preferably four teeth and a crank-pin $u$, on which we mount a connecting-rod $v$, whose opposite extremity is pivotally connected to an arm $w$, extending from the rudder-post $x$. By this arrangement the rudder $y$ will assume the position $y'$ after the next impulse has permitted the shaft $o$ to move through the distance of another tooth, and the second impulse will cause the rudder $v$ to again assume its central position. The third step will set the rudder at $y^2$, and the fourth will again return it to its central position, and so on.

What we claim as our invention, and desire to secure by Letters Patent, is—

1. In electromagnetic-wave-receiving mechanism, a receiving-circuit including a coherer, an automatically-operated decohering device, a circuit controlling the latter and means for automatically opening this circuit and keeping it open during the decohering operation for the purpose set forth.

2. In electromagnetic-wave-receiving mechanism, a receiving-circuit including a coherer, an automatically-operated decohering device, a supplemental circuit or circuits, a switch controlling the same and automatically operated by the main receiving-circuit when electrically signaled and means for automatically opening the supplemental circuit prior to effecting decoherence substantially as set forth.

3. In electromagnetic-wave-receiving apparatus, a normally closed electric circuit having a coherer, a battery or its equivalent and an electromagnet adapted to operate a switch to cut in a shunt by which the coherer is short-circuited and a suitable telegraph instrument or equivalent device operated by allowing the greater part of the current of said battery to flow through the magnet of said instrument energizing the same, substantially as described.

4. In electromagnetic-wave-receiving apparatus, a normally closed circuit including a coherer, a battery, and an electromagnet, a switch arranged to be cut in by said electromagnet, a shunt arranged to be cut in by said switch thereby short-circuiting the said coherer, another electromagnet arranged to be energized by said shunt, the armature of this latter magnet, a detent carried by said armature and arranged to be drawn out of engagement when said armature is attracted, a ratchet-wheel normally engaged by said detent, a motor, on the shaft of which the said ratchet-wheel is fast, a break-wheel operated thereby and forming part of the receiving-circuit and decohering mechanism operated by the stopping of the motor, which is caused on the opening of the circuit by the return of the detent to its normal position, engaging the next tooth of the ratchet-wheel substantially as set forth.

5. In electromagnetic-wave-receiving apparatus, an electric circuit comprising a generator of electricity, a coherer and an electromagnet, a trip-hammer or equivalent decohering device arranged to act automatically on said coherer, a mechanical motor actuating the said hammer, a ratchet and pawl controlling the said motor to a step-by-step motion, circuit-opening mechanism operated by the said motor and permitting the return of the said detent to its engaging position and electrically-operated means withdrawing the said pawl from such engagement while the circuit controlling the said pawl is closed, the aforesaid devices being arranged to keep this circuit open while decoherence is effected and to stop the motor as each cycle of operations is completed substantially as set forth.

6. In electromagnetic-wave apparatus, the combination with a receiving apparatus having a shaft adapted to be rotated step by step on the arrival of signals of a suitable crank rotated by the said shaft and a connecting-rod to transmit motion from the said crank to the steering-gear of torpedoes or to other mechanism, substantially as described.

In testimony whereof we have signed our names to this specification in the presence of two subscribing witnesses.

JAS. T. ARMSTRONG.
AXEL ORLING.

Witnesses:
ADA M. BIRD,
EDGAR O. GODDIN.